Patented July 21, 1942

2,290,439

UNITED STATES PATENT OFFICE 2,290,439

HYDROGENOLYSIS PROCESS

Charles William Lenth and Robert N. Du Puis, Chicago, Ill., assignors to Association of American Soap & Glycerine Producers, Inc., New York, N. Y., a corporation of Delaware No Drawing. Application July 21, 1938, Serial No. 220,498

9 Claims. (Cl. 260—635)

This invention relates to a method of splitting and hydrogenating the molecules of sugars or their corresponding alcohols to produce alcohols of lower molecular weight (i. e., having a smaller number of carbon atoms), which reaction is hereinafter referred to as hydrogenolysis, as distinguished from simple hydrogenation, and which method comprises the treatment of sugars or substances closely approaching sugars, such as alcohols derived from sugar dextrins, with gaseous hydrogen at pressures between 800 and 3000 pounds per square inch (preferably from 1000 to 2000 pounds per square inch), while the same are incorporated in a vehicle composed of methyl alcohol, and while contact of the reactants with a contact agent or catalyst of the group comprising copper-aluminum oxide and copper-chromium oxide is provided and while the temperature of the reacting mass is maintained between 150 and 300 degrees C.

This application is a continuation in part of our copending application, Serial No. 62,800, filed February 7, 1936, to which reference is hereby made.

It is the discovery of this invention that material advantages occur when methyl alcohol, specifically, is employed as a vehicle for the substance being acted upon by the hydrogen, providing one or more catalysts are employed which are members of the group comprising copper-aluminum oxide and copper-chromium oxide. Operation, in accordance with this invention, is attended by a marked increase in the facility with which hydrogenolysis proceeds. This increase is so marked that operation at moderate temperatures and pressures is not only feasible but desirable and under such conditions the resulting product contains a higher proportion of valuable constituents and a lower proportion of undesirable tarry or acidic constituents.

We are aware that in the art several procedures for hydrogenolysis of sugars or related substances have been described. While in most of these methods the material treated is carried in a vehicle consisting of water, in some instances it is directed that ethyl alcohol be employed as a vehicle and in others that alcohols generally be so employed. None of these methods known prior to our invention has used, or has proposed to use, methyl alcohol as a vehicle in conjunction with the copper-aluminum oxide or copper-chromium oxide catalysts. In one instance in which it has been proposed that alcohols generally are suitable as vehicles, nickel as catalyst is stressed, but nickel has been found to have very poor catalytic effect in methyl alcohol vehicle. In other instances the use of copper-chromium oxide as catalyst is described, but in conjunction with ethyl alcohol as a vehicle, which gives to the reaction an entirely different course and the advantages of methyl alcohol as a vehicle are entirely overlooked therein.

On the other hand, by the methods of this invention hydrogenolysis to produce a good yield of valuable product at the relatively moderate pressure of 1000 to 2000 pounds per square inch and at the moderate temperature of 150 to 300 degrees C. is feasible, while most prior processes have been operated at much higher pressures. Further, in operating in accordance with this invention the final product is lower in tarry and acidic products and sufficiently so that purification steps essential with the products of earlier methods may be substituted by greatly simplified purification procedure, such as simple neutralization.

As instances of practicing of the methods of this invention, the following ingredients were placed in a pressure-resisting vessel which could be heated and agitated:

| | Parts |
|---|---|
| Sucrose (dry, granulated) | 85.5 |
| Methyl alcohol (commercial anhydrous) | 40 |
| Copper-barium-chromium oxide catalyst (or copper-aluminum oxide catalyst) | 5 |

Through appropriate means, hydrogen gas was run into the vessel until a pressure of 1000 pounds per square inch was obtained and the vessel was then closed, heated, and agitated.

By noting the drop in pressure of the contents of the vessel and with knowledge of the free space therein, the progress of the reaction was observed and the hydrogen input, i. e., mols of hydrogen absorbed per mol of sucrose treated, was noted. After three and one-half hours of treatment it was noted that 3.8 mols of hydrogen had been absorbed. The product resulting after removal by distillation of the vehicle and all other constituents boiling below 125 degrees C. consisted of material liquid at room temperature and representing in terms of the original sucrose a yield of 61.2 per cent. Contained therein was 17% of propylene glycol, the remaining constituents comprising alcohols not easily identified. This product diluted with an equal volume of water possessed a freezing point of −10 degrees C.

In operating as above described, absorption of hydrogen substantially ceased prior to the termination of the three and one-half hour treatment period. The average pressure prevailing during the reaction, due to absorption of hydrogen was substantially less than 1000 pounds per square inch. This is in a measure controlled by the ratio of sucrose undergoing treatment to the volume of free space in the pressure vessel (in this case 7.6 cc. free space per gram of sucrose treated). The larger the free space in relation to the material treated, the higher the average pressure and the farther the reaction proceeds before substantial stoppage and the larger the hydrogen absorption per mol of sucrose. It is also obvious that with a constant ratio of free space to material being treated a similar effect is obtained if during the reaction the vessel is opened and additional charges of hydrogen gas supplied, or if the original charge of hydrogen gas is at a higher pressure.

With all other conditions the same as those described in the specific instance above, with the exception of the initial charging pressure of the hydrogen, the following results were obtained, illustrating the effect of variation of maximum treating pressure:

The classes of materials suitable as raw material in the process of this invention, as defined and illustrated above, are all true sugars or closely related substances and, for convenience herein, substances falling within the classification hereinabove mentioned will be referred to as one or more of the groups of sugars, dextrines, or sugar alcohols. The substances classified and illustrated above include as well commercial forms thereof, a few examples of which are dextrose (anhydrous), dextrose hydrate, cane sugar, beet sugar, semi-refined cane sugar, raw cane sugar, molasses, hydrol, sorbitol, and mannitol.

The following is an instance of the application of the process of this invention to another of the group of sugars:

| | Parts |
|---|---|
| Dextrose (commercial anhydrous) | 90 |
| Methyl alcohol (commercial anhydrous) | 40 |
| Copper-barium-chromium oxide catalyst (or copper-aluminum oxide catalyst) | 5 | were placed in a pressure-resisting vessel having a free space relative to weight of dextrose of 7.2 cc. per gram of dextrose. Hydrogen was then

| | Maximum pressure $\#$ in.$^2$ | Mols hydrogen absorbed | Percent yield propylene glycol | Percent yield crude glycerine | Percent yield liquids boiling above glycerine | Percent yield total liquids boiling above 125° C. | Freezing point (° C.) water mixtures of total liquids boiling above 125° C. | |
|---|---|---|---|---|---|---|---|---|
| | | | | | | | 50% water by volume | 42% water by volume |
| A | 1,300 | 4.8 | 36.6 | 20.1 | 17.9 | 79.7 | −21.5 | −30.5 |
| B | 1,500 | 4.9 | 40.1 | 25.1 | 11.7 | 80.9 | −23.5 | −32.0 |
| C | 2,000 | 5.1 | 41.2 | 23.1 | 12.2 | 82.9 | −23.5 | −32.5 |
| D | 3,000 | 6.3 | 46.1 | 16.1 | 12.2 | 79.5 | −22.5 | −32.5 |

It will be noted from the above that if the product sought is one suitable as a freezing point depressant (one of the chief uses of value for products of this character), that the process of this invention is most effective at maximum pressures of 1500 to 2000 pounds per square inch and that a substantial yield of crude glycerine is obtained.

The gaseous contents of the pressure vessel will be composed of hydrogen as well as methanol vapor and vapor of any other volatile constituents. As the vessel is heated, the total pressure rises due to increased partial pressure of volatile constituents. When substantial absorption of hydrogen begins to take place, a maximum total pressure occurs, usually before the final treating temperature is reached. The partial pressure of the hydrogen is therefore always somewhat less than the maximum total pressure and in the examples above given is less than the maximum pressure stated in the table.

The crude glycerine fraction contains definite quantities of glycerol, particularly at the preferred pressures of 1500 to 2000 pounds per square inch. By "crude glycerine" is meant a mixture of glycerine with substances closely approaching glycerine in physical properties, which mixture is difficultly separable by distillation.

The class of raw materials upon which the process of this invention will operate successfully includes the sugars such as sucrose, dextrose, maltose, lactose, levulose, and other typical sugars, as well as closely approaching substances, such as dextrines and the closely related derivatives of sugars, herein called sugar alcohols, such as the high molecular weight alcohols containing six or more hydroxyl groups and six or more carbon atoms, for example, sorbitol and mannitol.

run into a pressure of 1300 pounds per square inch and heating and agitation carried forward at 250 degrees C. for approximately three and one-half hours (in this instance until 2.3 mols of hydrogen were absorbed per mol of dextrose). The product resulting from this treatment after distilling off the methyl alcohol vehicle and constituents boiling below 125 degrees C. consisted of a substance, liquid at room temperature, in amount equivalent to a yield of 82.4% on the basis of the original dextrose. Of this high boiling product, 55% was composed of propylene glycol and glycerine. The freezing point of a 50 per cent by volume solution of the high boiling product in water was −19 degrees C. and a 58.8 per cent by volume solution in water had a freezing point of −26.5 degrees C.

Any of the starting materials or their related substances herein mentioned when subjected to the steps hereinabove detailed at pressures between 900 and 3000 pounds per square inch and at temperatures between 150 and 300 degrees C. are hydrogenolytically converted to lower alcohols in a manner fully equivalent to that experienced in the case of the specific instances herein cited. By "lower alcohols" we refer to substances containing six or less carbon atoms and four or less hydroxyl groups, being thus related to the specific substances herein mentioned, such as glycerine, propylene glycol, and the like.

The part played by the vehicle in the process of this invention is of primary importance. Some of the sugar compounds employed as starting material are to a large extent insoluble or immiscible in cold methyl alcohol. At the completion of the reaction, however, complete miscibility seems to occur. In spite of this fact, the methyl alcohol has a pronounced effect in deterring the formation of carmelized, tarry, or acidic products, which form in quantities when no vehicle or other immiscible vehicles, such as hydrocarbons, are employed. In fact, the methyl alcohol has an inhibiting effect upon the formation of such tarry or acidic products pronouncedly superior to that of water heretofore commonly employed as a vehicle. At the same time, the methyl alcohol appears to perform a cooperative function in conjunction with the particular catalysts employed in the process of this invention, as is evidenced, first, by the enhanced smoothness, speed, and completeness of the reaction obtained at lower pressures when compared with operation in water vehicle, and, second, by the proportions of constituents obtained in the product of the reaction.

The methyl alcohol vehicle is increased rather than diminished in amount during the course of the reaction and may be recovered and used for succeeding reactions. We believe that the vehicle enters into the contact phenomena occurring on the surface of the catalyst and brings about a state of activity of the catalyst not existent in any other vehicle. The catalyst, under certain conditions, may be employed in its oxide or unreduced form at the beginning of the reaction and from color changes occurring during its use it is apparent that modification thereof during use occurs. This modification appears to be beneficially affected by the presence of the methyl alcohol vehicle.

While best results are obtained when the methyl alcohol vehicle, at the start, is substantially free of water, the benefits of the invention may be obtained to diminished degree if some water is present. This can be readily understood when it is appreciated that some water is produced as a product of the reaction.

The catalysts employed herein may be prepared by co-precipitation of such compounds of the metals mentioned that, upon heating, yield oxides of the metals in question and by subsequently igniting the precipitate to decompose the compounds contained therein to form the catalyst. The catalyst may be prepared also by ignition of a ground mixture of the oxides of the metals in question, or by other means. In the case of the well-known copper-chromium oxide catalyst, the active constituent appears to be the copper-chromium oxide, although barium may be added to perform a regulating or promoting function, which may also be performed in certain instances by calcium or strontium. Therefore, in using the term "copper-chromium oxide catalyst" herein, it is intended to include such catalyst with, or without, regulating or promoting components. Likewise, in the case of the copper-aluminum oxide catalyst, which is a catalyst described and claimed in our copending application, Serial No. 96,476, filed August 17, 1936, the use of an alkali metal compound or alkaline earth metal compound as a promoter incorporated with the catalyst, or added with the reacting mass, has at times been found advantageous. Therefore, the term "copper-aluminum oxide" as used herein refers to such catalyst with, or without, a promoting, or regulating, component.

What we claim as our invention and wish to secure by Letters Patent is:

1. The method of producing lower alcohols by hydrogenolysis of a substance selected from the group consisting of sugars, dextrins, and sugar alcohols, which comprises subjecting such substance to the action of gaseous hydrogen at pressures between 800 and 3000 pounds per square inch at temperatures between 150 and 300 degrees C. while such substance is incorporated in a vehicle consisting of substantially anhydrous methyl alcohol and while such substance is in contact with a catalyst selected from the group consisting of copper-aluminum oxide and copper-chromium oxide.

2. The method of producing lower alcohols by hydrogenolysis of sugars which comprises subjecting a sugar to the action of gaseous hydrogen at pressures between 800 and 3000 pounds per square inch and at temperatures between 150 and 300 degrees C. while such sugar is incorporated in a vehicle consisting of substantially anhydrous methyl alcohol and while such sugar is in contact with a catalyst selected from the group consisting of copper-aluminum oxide and copper-chromium oxide.

3. The method of producing lower alcohols by hydrogenolysis of dextrins which comprises subjecting a dextrin to the action of gaseous hydrogen at pressures between 800 and 3000 pounds per square inch and at temperatures between 150 and 300 degrees C. while such dextrin is incorporated in a vehicle consisting of substantially anhydrous methyl alcohol and while such dextrin is in contact with a catalyst selected from the group consisting of copper-aluminum oxide and copper-chromium oxide.

4. The method of producing lower alcohols by hydrogenolysis of sucrose which comprises subjecting sucrose to the action of gaseous hydrogen at pressures between 800 and 3000 pounds per square inch and at temperatures of 150 to 300 degrees C. until approximately 5.1 mols of hydrogen is absorbed per mol of sucrose while such sucrose is incorporated in a vehicle consisting of substantially anhydrous methyl alcohol and while such sucrose is in contact with a catalyst selected from the group consisting of copper-aluminum oxide and copper-chromium oxide.

5. The method of producing lower alcohols by hydrogenolysis of dextrose which comprises subjecting dextrose to the action of gaseous hydrogen at pressures between 800 and 3000 pounds per square inch and at temperatures of 150 to 300 degrees C. until approximately 2.3 mols of hydrogen are absorbed per mol of dextrose while such dextrose is incorporated in a vehicle consisting of substantially anhydrous methyl alcohol and while such dextrose is in contact with a catalyst selected from the group consisting of copper-aluminum oxide and copper-chromium oxide.

6. The method of producing lower alcohols by hydrogenolysis of a substance selected from the group consisting of sugars, dextrins, and sugar alcohols, which comprises subjecting such substance to the action of gaseous hydrogen at pressures between 800 and 3000 pounds per square inch at temperatures between 150 and 300 degrees C. while such substance is incorporated in a vehicle consisting of substantially anhydrous methyl alcohol and while such substance is in contact with copper-aluminum oxide catalyst.

7. The method of producing lower alcohols by hydrogenolysis of a substance selected from the group consisting of sugars, dextrins, and sugar alcohols, which comprises subjecting such substances to the action of gaseous hydrogen at pressures between 800 and 3000 pounds per square inch at temperatures between 150 and 300 degrees C. while such substance is incorporated in a vehicle consisting of substantially anhydrous methyl alcohol and while such substance is in contact with copper-chromium oxide catalyst.

8. The method of producing lower alcohols by hydrogenolysis of a substance selected from the group consisting of sugars, dextrins, and sugar alcohols, which comprises subjecting such substances to the action of gaseous hydrogen at pressures of approximately 1000 to 2000 pounds per square inch and at temperatures of 150 to 300 degrees C. while such substance is incorporated in a vehicle consisting of substantially anhydrous methyl alcohol and while such substance is in contact with a catalyst selected from the group consisting of copper-aluminum oxide and copper-chromium oxide.

9. The method of producing lower alcohols by hydrogenolysis of a substance selected from the group consisting of sugars, dextrins, and sugar alcohols, which comprises subjecting such substances to the action of gaseous hydrogen at pressures of approximately 1000 to 2000 pounds per square inch and at temperatures of 200 to 250 degrees C. while such substance is incorporated in a vehicle consisting of substantially anhydrous methyl alcohol and while such substance is in contact with a catalyst selected from the group consisting of copper-aluminum oxide and copper-chromium oxide.

CHARLES WILLIAM LENTH.
ROBERT N. DU PUIS.